United States Patent [19]

Kominami

[11] 3,737,575

[45] June 5, 1973

[54] FACSIMILE SCANNING APPARATUS

[75] Inventor: Takuji Kominami, Ota-ku, Tokyo, Japan

[73] Assignee: Matsushita Graphic Communication Systems, Inc., Tokyo, Japan

[22] Filed: Dec. 14, 1971

[21] Appl. No.: 207,865

[30] Foreign Application Priority Data

| | | |
|---|---|---|
| Dec. 16, 1970 | Japan | 45/13845 |
| Dec. 24, 1970 | Japan | 45/130356 |
| June 15, 1971 | Japan | 46/51298 |

[52] U.S. Cl. .......... 178/7.6, 346/134

[51] Int. Cl. .......... H04n 1/08

[58] Field of Search .......... 178/6, 7.6; 346/134, 346/136, 138

[56] References Cited

UNITED STATES PATENTS

| | | | |
|---|---|---|---|
| 3,588,335 | 6/1971 | Harris | 178/7.6 |
| 2,695,785 | 11/1959 | Dashiell | 346/138 |

*Primary Examiner*—Howard W. Britton

*Attorney*—William D. Hall, Elliott I. Pollock, Fred C. Philpitt et al.

[57] ABSTRACT

In a facsimile system, a scanning is provided in which an original or a recording paper fed in a flat form is wound around the outer periphery of a transparent cylinder by the rotation of an endless belt so that the original or the recording paper is scanned from inside the transparent cylinder by means of a scanning slider.

6 Claims, 6 Drawing Figures

FACSIMILE SCANNING APPARATUS

BACKGROUND OF THE INVENTION

The present invention relates to a scanning apparatus in a facsimile transmitting system or a facsimile receiving system, and more particularly to a scanning apparatus designed for scanning from the inside of a cylinder.

Conventional scanning apparatus employed in facsimile transmitting or receiving systems are of two basic types, i.e., the so-called cylindrical scanning and the planary scanning types. As is well known, in the cylindrical scanning type an original to be transmitted, or a recording paper, is wound on a cylinder and an optically scanning slider or a recording pen is moved while the cylinder is being rotated. In other words, the cylindrical scanning type apparatus uses a cylinder and a scanning slider which is moved while the cylinder is being rotated Scanning apparatuses of this type, presently used widely in facsimile systems, are thus simple in mechanism and highly stable.

However, a disadvantage of the cylindrical scanning type apparatus is that the operation required for winding an original or the like around the cylinder is not easy and thus, owing to an inconvenience from this aspect of their operation, the cylindrical scanning type apparatus has recently been replaced steadily increasingly by apparatus of the planary scanning type. Advantages of the planary scanning type apparatus include; (1) a highly simplified operation in that when used in a facsimile transmitter the apparatus can be operated by only supplying an original thereto, and (2) its capability that, when used to transmit several originals, the originals can be simply supplied to the apparatus successively thereby permitting the installation of an automatic sheet feeding device. The facsimile scanning apparatus employing a glass-fiber scanning device is the most-often-used type of the planary scanning apparatus. However, this glass-fiber scanning device type is also disadvantageous in that the structure of the glass-fiber scanning device for linear to circular scanning conversion requires considerable space thus making the apparatus larger, and the manufacture of the glass-fiber scanning device requires the complicated work of arranging several thousands of very fine glass fibers regularly thus making the manufacturing cost higher, than that of the conventional cylindrical scanning type apparatus.

SUMMARY OF THE INVENTION

It is an object of the present invention to provide a facsimile scanning apparatus which combines the features of both the cylindrical scanning type and the planary scanning type.

It is another object of the present invention to provide a scanning apparatus which comprises an endless belt surrounding a transparent cylinder and supported by a plurality of belt rollers interposed between the cylinder and the endless belt, whereby an original to be transmitted or a light-sensitive recording paper which is fed in a flat form to the transparent cylinder is taken up between the transparent cylinder and the endless belt and the thus taken up original or recording paper is then held stationary at a predetermined position on the circumference of the transparent cylinder, so that the original or recording paper is scanned by an optically scanning slider moved within the transparent cylinder in the axial direction thereof while turning on its axis and then, after the completion of the scanning, the original or the recording paper is discharged to the outside from the transparent cylinder.

It is a further object of the present invention to provide a scanning apparatus of the type described wherein by the use of a single plate an original or a recording paper is guided in a flat form to the transparent cylinder and it is then discharged therefrom to the outside.

It is a still further object of the present invention to provide a scanning apparatus of the type described further comprising means for preventing the endless belt from being shifted in one or the other direction.

It is a still further object of the present invention to provide a scanning apparatus of the type described which is designed to automatically take up thereinto and automatically discharge therefrom an original or recording paper.

According to the present invention, the operation of the scanning apparatus is as simple as the operation of the previously described planary scanning type apparatus. Moreover, the apparatus according to the present invention can be operated continuously by employing any known automatic sheet feeding means. Still furthermore, by employing the scanning apparatus of the present invention, a smaller and more compact facsimile system can be constructed and at the same time a stable scanning operation as obtainable with the cylindrical scanning type apparatus can be ensured.

BRIEF DESCRIPTION OF THE DRAWINGS

A better understanding of the present invention may be had from the following detailed description when read in conjunction with the accompanying drawings, wherein.

DESCRIPTION OF THE PREFERRED EMBODIMENTS

Figures 1, 2, 3:
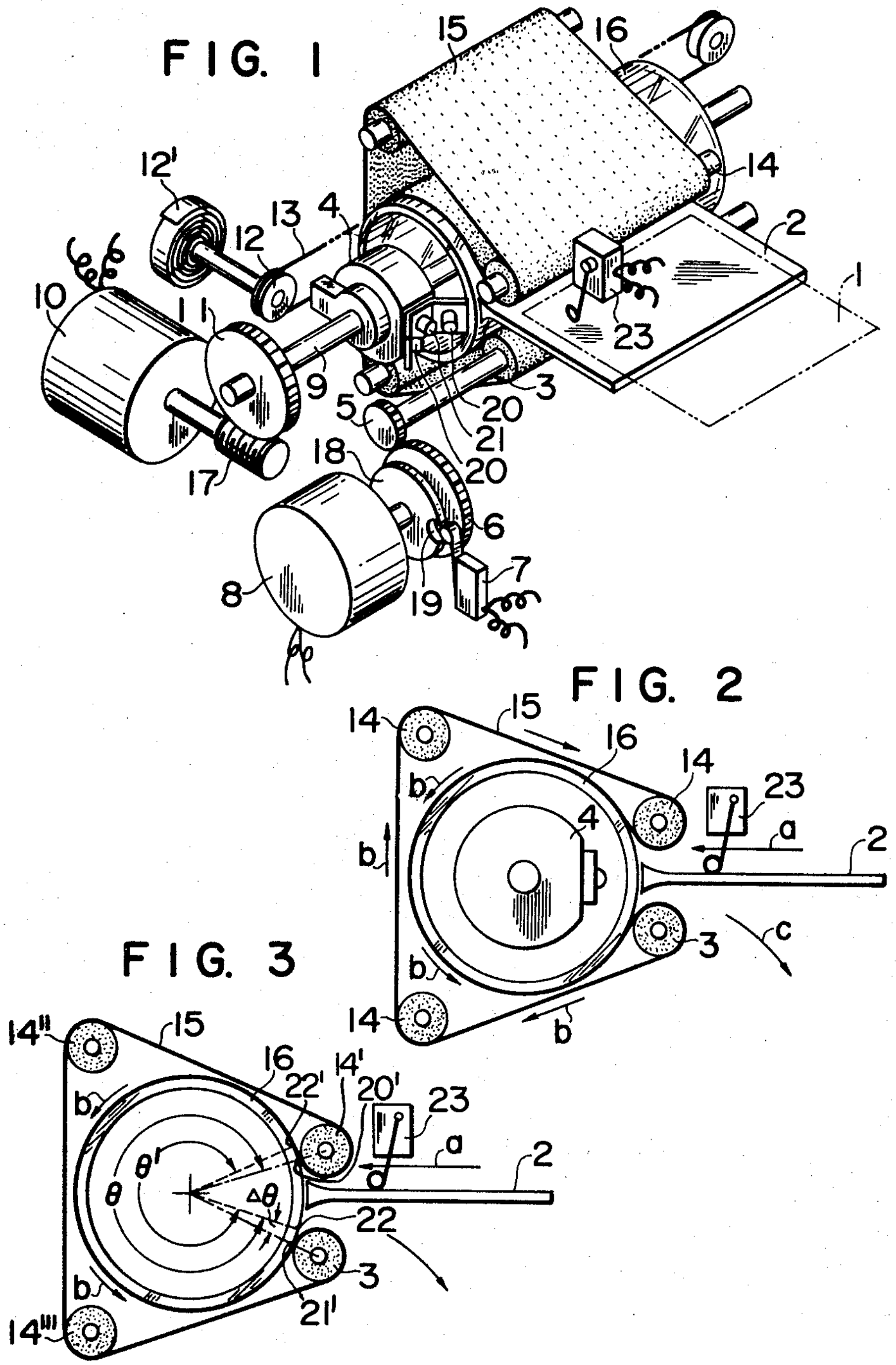
FIG. 1 is a schematic view of the scanning apparatus for facsimile transmitting systems according to the present invention.
FIG. 2 is a side sectional view of the apparatus of FIG. 1, which is useful for explaining the original positioning means used with the apparatus of FIG. 1.
FIG. 3 is a side sectional view of the apparatus of FIG. 1, which is useful for explaining the automatic winding and discharging means used with the apparatus of FIG. 1.

FIG. 1 illustrates the scanning apparatus of the present invention as applied to a facsimile transmitting system. In FIG. 1, an original 1 to be transmitted as shown by a phantom line is placed on a guide bed 2 with it surface being placed upside down. As the original 1 is fed in this manner utilizing the guide bed 2 as its guide, the leading edge of the original 1 is drawn between an endless belt 15 and a transparent cylinder 16. Then, as a belt driving motor 8 is started, a belt driving roller 3 is rotated by means of a drive gear 6 and a driven gear 5 to transmit the rotation of the belt driving roller 3 to the endless belt 15. The endless belt 15 is wound around belt rollers 14 and the belt driving roller 3 as well as around the transparent cylinder 16, so that the instant the endless belt 15 is rotated, the transparent cylinder 16 is also started rotating and thus the original 1 having its leading edge caught between the endless belt 15 and the transparent cylinder 16 is taken up on the outer periphery of the cylinder 16. In this connection, a disk 18 mounted on the same shaft as the gear 6 turns once for every rotation of the driving gear 6 and a one-rotation-control switch 7 is actuated by means of a groove 19 on the disk 18 thereby stopping the rotation of the belt driving motor 8. In this manner, the original 1 can be always taken up and wound on the transparent cylinder 16 at a predetermined position on the outer periphery thereof.

Then, a scanner driving shaft 9 is rotated by a synchronous motor 10 through a motor gear 17 and a worm gear 11. The rotation of the scanner driving shaft 9 results in the rotation of an optically scanning slider 4 comprising an optical system including a light source lamp 20, a condensing lens 21, a photo-electric conversion element and so on, so that the information carrying surface of the original 1 wound on the outer periphery of the transparent cylinder 16 is scanned from the inside of the transparent cylinder 16 by the optically scanning slider 4, thereby effecting the main scanning. In this case, the optically scanning slider 4 must be moved in the axial direction of the transparent cylinder 16 simultaneously with the rotation of the optically scanning slider 4. For this reason, a wire driving pulley 12 is rotated by a driving mechanism which is not shown so that the optically scanning slider 4 is regularly moved to the right in FIG. 1 by a scanner driving wire 13, thereby effecting the sub-scanning.

Upon the completion of the scanning for facsimile transmission, the optically scanning slider 4 is returned to the initial position by a return spring 12' mounted on the same shaft as the wire driving pulley 12. On the other hand, the original 1 wound on the transparent cylinder 16 is discharged to the outside of the apparatus along the lower surface of the guide bed 2 serving as a discharging guide when the endless belt 15 is rotated again upon the restarting of the belt driving motor 8.

When another original 1 is fed with the guide bed 2 serving as a guide, the same process of taking up, transmission scanning and discharging operations is repeated.

The means for taking up and discharging originals as described above will now be discussed in detail with reference to the schematic side sectional view shown in FIG. 2. The guide bed 2 is formed at one end thereof with an upwardly curved upper surface portion and a downwardly curved lower surface portion. The guide bed 2 is also disposed such that its end face including the said curved portions is located adjacent to and parallel to the cylindrical side of the transparent cylinder 16. Consequently, when the original 1 (FIG. 1) is fed over the guide bed 2 in the direction of arrow *a*, the original 1 is taken up between the transparent cylinder 16 and the endless belt 15 rotated by the belt driving roller 3 in the direction of arrow *b*, thereby placing the original on the outer periphery of the transparent cylinder 16. When this occurs, the optically scanning slider 4 is moved in the axial direction while turning on its axis effecting the scanning for facsimile transmission, and upon the completion of the scanning operation the belt driving roller 3 is rotated again rotating the endless belt 15 again in the direction of the arrow *b* and thus discharging the original below the guide bed 2 in the direction of arrow *c*.

Next, automatic take up and automatic discharging mechanisms of originals will be explained with reference to FIG. 3. In the figure, numerals 14', 14'' and 14''' separately designate belt rollers corresponding to the belt rollers 14 in FIG. 1 for purposes of explanation. When the original (FIG. 1) is fed in the direction of arrow *a* over the guide bed 2, a microswitch 23 mounted on the guide bed 2 is pressed by the original so that a timer (not shown) connected to the microswitch 23 is actuated and at the same time the leading edge of the original is drawn between the endless belt 15 and the transparent cylinder 16 at a position 20' where the supporting roller 14' and the transparent cylinder 16 practically contact with each other. Almost concurrently, the belt driving motor 8 (FIG. 1) is started rotating by a signal from the timer. In other words, the microswitch 23 is mounted in such a manner that the belt driving motor 8 is started by the timer when the leading edge of the original arrives at the position 20'. Consequently, as previously explained, the original having its leading edge held between the endless belt 15 and the transparent cylinder 16 is wound on the outer periphery of the transparent cylinder 16. In this case, the original is held stationary on the outer periphery of the transparent cylinder 16 when it has rotated through $\theta$ degrees. In other words, assuming that $r$ is the radius of the transparent cylinder 16 and $l$ is the length of the original to be transmitted, the angle of rotation through which the original must be wound on the transparent cylinder 16 is given by $(2\pi r/l) = \theta'$ and the angle $\theta$ is determined so that the relation $\theta = \theta' + \Delta\theta$ holds. It is also arranged that the angle between the position 20' and a position 21', at which the belt driving roller 3 and the transparent cylinder 16 almost contact with each other, corresponds to the angle $\theta'$. Accordingly, the leading edge of the original is rotated from the position 20' to a point 22 slightly (by $\Delta\theta$) beyond the position 21'. In this way, the original is wound around the transparent cylinder 16 extending from the position 22 to a point 22' slightly (by $\Delta\theta$) beyond the position (20'). Here, in order for the original to be rotated through $\theta$ degrees from the position 20', the angle of rotation of the belt driving roller 3 may be determined in such a manner that the transparent cylinder 16 is rotated through $\theta$ degrees. Accordingly, the angle of rotation of the belt driving roller 3 can be determined by the gear ratio between the gear 6 rotated under the control of the one-rotation-control switch 7 (FIG. 1) and the gear 5 meshing with the gear 6. Then, as the optically scanning slider 4 (FIG. 1) is moved in the axial direction while turning on its axis, thereby starting and eventually completing the scanning for facsimile transmission, the belt driving roller 3 is rotated again rotating the endless belt 15 again in the direction of the arrows *b* and thus rotating the original through $\theta$ degrees. Consequently, the original having the length corresponding to the angle $\theta'$ is entirely discharged in the direction of the arrow *c* below the guide bed 2. In other words, after the $\theta$ degrees of rotation, the trailing edge of the original arrives at the position 22 so that the original is released from the endless belt 15 and thus the origznal is automatically discharged to the outside of the ap paratus by virtue of its own weight. It is to be noted that the value of $\Delta\theta$ mentioned above may be suitably selected by considering two factors, i.e., the degree of floating of the original from the transparent cylinder 16 (if the degree of floating is large, it is not desirable from the standpoint of scanning quality) and the quality of the operation for discharging the original to the outside by its own weight.

It should be noted here that while in the example described above the leading edge of the original to be transmitted is held stationary at a point slightly beyond the position 21', where the leading edge of the original is held at the position 21' or at a point short of the position 21', the similar automatic take up and automatic discharging operations can be accomplished, if the position of the driving roller 3 is suitably selected and the above rotational angle $\theta$ is also suitably selected to permit the discharging of the original.

While the present invention has been explained as applied to a facsimile transmitting system, the present invention can also be applied to a facsimile receiving system, if a light sensitive recording paper (such as printing paper and electro-photographic recording paper) is used in place of the original 1 and the optically scanning slider 4 is further provided with a photoelectric conversion element (e.g., discharge tube).

Figure 4:
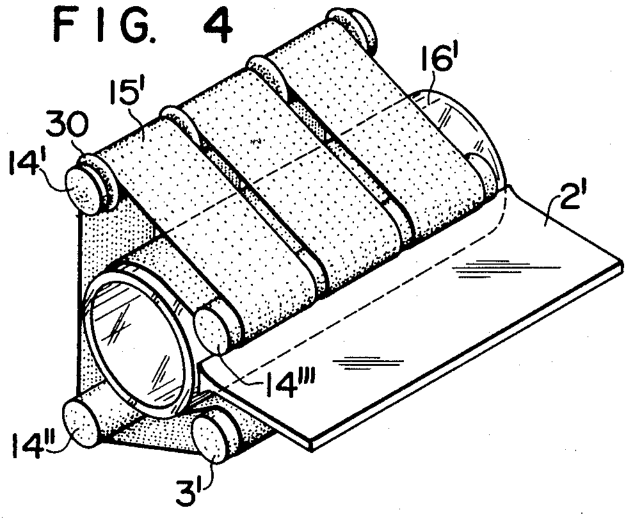
FIG. 4 is a simplified perspective view showing another embodiment of a part of the apparatus of FIG. 1.
Figure 5:
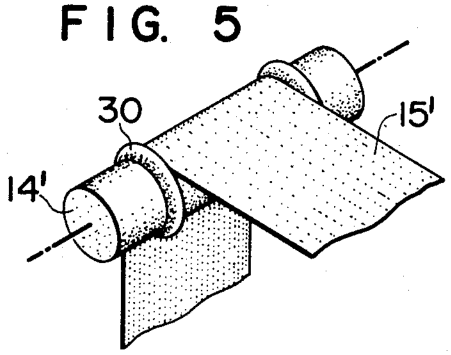
FIG. 5 is a perspective view showing the principal part of FIG. 4.
Figure 6:
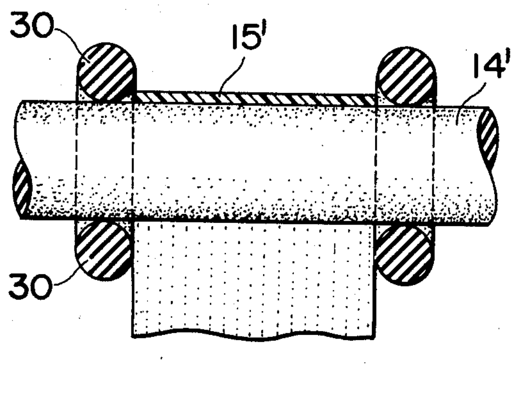
FIG. 6 is a sectional view of FIG. 5.

Referring now to FIG. 4 illustrating a schematic view of a modified form of a portion of the apparatus shown in FIG. 1, the identical component parts as shown in FIG. 1 are designated by the same reference numerals each having a prime. In FIG. 1, as the endless belt 15 is rotated as the result of the rotation of the belt driving roller 3 as previously described, a phenomenon occurs in which the endless belt 15 is gradually shifted to the right or left due to slight deviation in the parallelism of the component parts of the transparent cylinder 16, belt rollers 14 and belt driving roller 3 existing in themselves or caused upon the installation thereof. Such a phenomenon may also be caused by the meshes of the endless belt 15. For these reasons, as shown in FIG. 4, belt shifting preventive rings 30 are mounted on the belt roller 14' on both sides of each endless belt 15', so that when the rotating endless belt 15' tends to gradually shift to the right or left, the belt shifting preventive rings 30 securely mounted on the belt roller 14' prevent the endless belt 15' from shifting to one side and thus the endless belt 15' rotates at a fixed position. Since the belt shifting preventive rings 30 are mounted in contact with both ends of the endless belt 15', it is preferable that the belt shifting preventive rings 30 be made of a material such as rubber, urethane or felt, since there is the danger of the sides of the endless belt 15' being damaged after the long hours of service. Furthermore, a form of the belt shifting preventive rings 30 which is circular in section as shown in FIG. 6 is the most preferable one, since this form of the rings does not cause damage to the sides of the endless belt 15'. The reason is that if the belt shifting preventive rings 30 are circular in section, at those positions where the endless belt 15' contacts with the belt roller 14', the endless belt 15' does not contact with the belt shifting preventive rings 30. In other words, if at those positions the endless belt 15' is allowed to come in contact with the belt shifting preventive rings 30, there is the danger of the endless belt 15' being shifted to one side along the belt shifting preventive ring 30 and thus eventually riding on the belt shifting preventive ring 30. However, if the belt shifting preventive rings 30 are circular in section, the rings 30 do not contact with the endless belt 15' at those positions where the endless belt 15' is in contact with the belt roller 14', whereas at those positions where the endless belt 15' is not in contact with the belt roller 14' the endless belt 15' is allowed to come in contact with the belt shifting preventive rings 30 thus eliminating the above-mentioned danger.

What is claimed is:

1. A facsimile apparatus comprising a rotatably mounted transparent cylinder, scanning means disposed within said cylinder, said scanning means being mounted for movement along the axis of said cylinder and for rotation about said axis, at least one endless belt wound substantially completely about the outer periphery of said transparent cylinder, said belt being carried by a plurality of belt rollers whereby rotation of at least one of said rollers is operable to drive said belts and to effect rotation of said cylinder, a portion of the outer periphery of said cylinder being left unenclosed by said belt to define an entrance location for a medium to be scanned, a guide bed disposed at said entrance location for guiding a medium to be scanned to a position between the outer periphery of said transparent cylinder and the inner surface of said endless belt, and selectively actuatable driving means for driving at least one of said plurality of belt rollers for a predetermined period of time to feed a medium to be scanned from said guide bed onto the exterior of said transparent cylinder to a predetermined position on the exterior of said transparent cylinder, thereby to position said medium for scanning by said interior scanning means through said transparent cylinder as said scanning means is moved axially and rotatably within said transparent cylinder.

2. A facsimile scanning apparatus according to claim 1, wherein said guide bed is provided, at a position adjacent to said transparent cylinder, with an upwardly curved upper surface and with a downwardly curved lower surface.

3. A facsimile scanning apparatus according to claim 1, wherein at least one of said plurality of belt rollers is provided with an outstanding ring for engagement with said endless belt to prevent lateral shifting of said belt along said roller.

4. A facsimile scanning apparatus according to claim 1 further including means for detecting the presence of said medium to be scanned when said medium is placed on said guide bed, and means for actuating said driving means for a predetermined period of time upon receipt of a signal from said detecting means.

5. The apparatus of claim 1 wherein said plurality of belt rollers support a plurality of endless belts in side-by-side relation to one another.

6. The apparatus of claim 1 wherein said driving means is deactuated after said predetermined period of time to hold said medium at a predetermined stationary position relative to said scanning means, means responsive to elapse of said predetermined period of time for driving said scanning means axially and rotatably through a scanning sequence, and means responsive to completion of said scanning sequence for reactuating said driving means to reinitiate rotation of said transparent cylinder thereby to discharge said medium from said cylinder.

* * * * *